United States Patent [19]
Knudsen et al.

[11] 3,983,595
[45] Oct. 5, 1976

[54] ARCUATE SCRAPER FOR CONCAVE SURFACES

[75] Inventors: Raymond G. Knudsen; Steven R. Wente, both of Kenosha, Wis.

[73] Assignee: Snap-on Tools Corporation, Kenosha, Wis.

[22] Filed: Dec. 8, 1975

[21] Appl. No.: 638,625

[52] U.S. Cl. .............................. 15/236 R; 30/162; 30/169
[51] Int. Cl.² ...................... A47L 13/08; B26B 1/08
[58] Field of Search ...................... 15/104 S, 236 R; 30/162, 169, 171, 320, 335, 356, 446.5

[56] References Cited
UNITED STATES PATENTS

| | | | |
|---|---|---|---|
| 806,333 | 12/1905 | Folden | 30/162 X |
| 1,447,039 | 2/1923 | Rhodes | 30/171 |
| 2,404,141 | 7/1946 | Nelson | 30/162 |
| 3,888,002 | 6/1975 | Graham | 30/162 |

*Primary Examiner*—Daniel Blum
*Attorney, Agent, or Firm*—Edward U. Dithmar

[57] ABSTRACT

An arcuate scraper for concave surfaces, such as the inside surface of many automobile windshields, having an elongated handle with a forward end portion arcuate in transverse cross section, a scraping blade disposed transversely on the concave surface of the forward end of portion, a longitudinally movable slider connected with the blade for extending and retracting the scraping edge thereof with respect to the forward end of the handle and a tiltable keeper operatively related to the slider for locking same and the blade alternatively in blade-extended and blade-retracted positions.

6 Claims, 9 Drawing Figures

U.S. Patent   Oct. 5, 1976   3,983,595
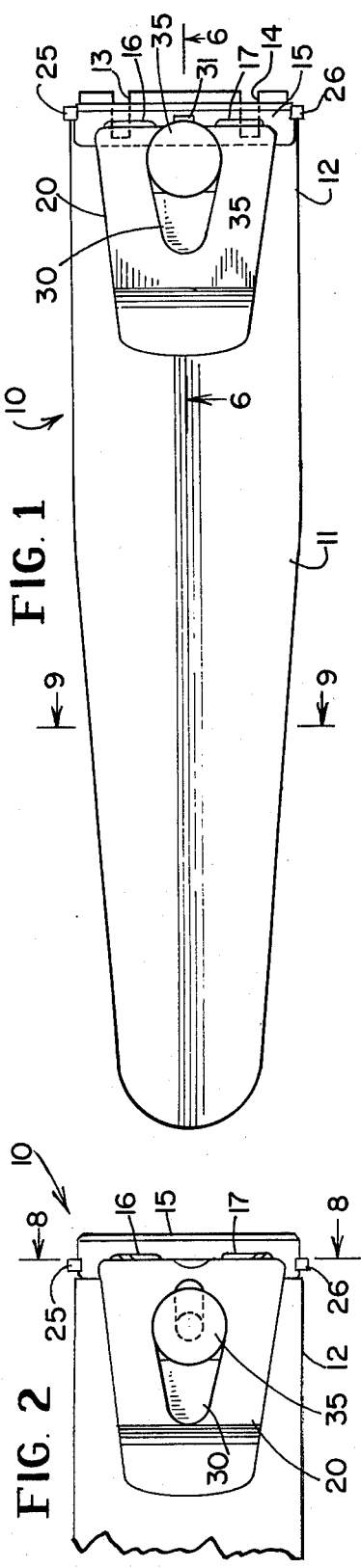
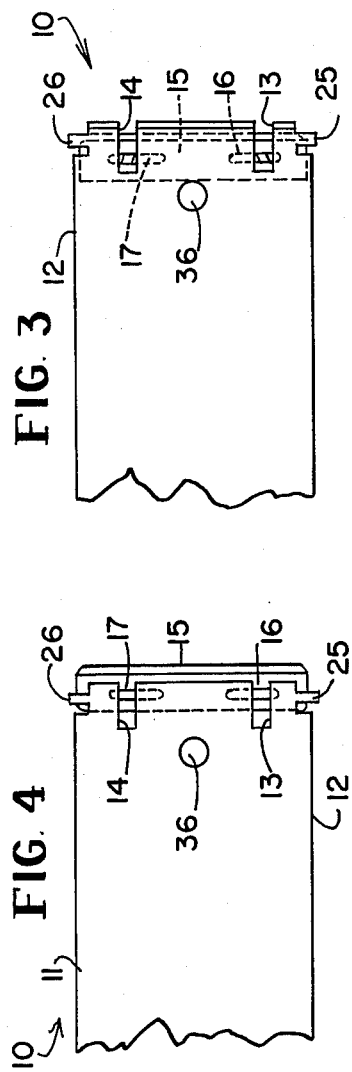
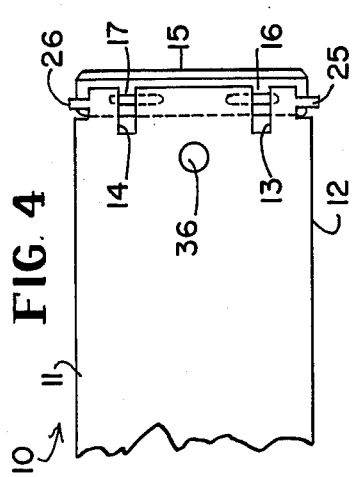
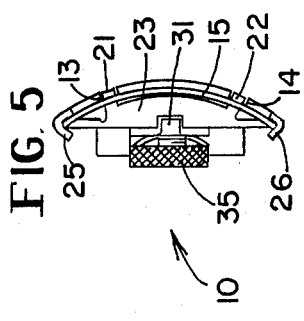
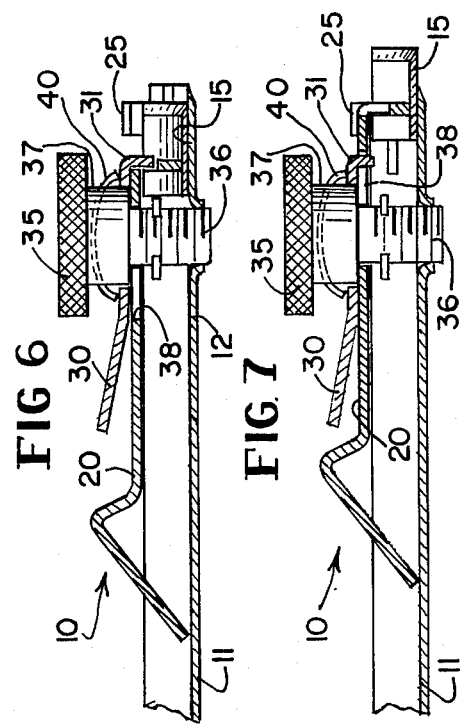
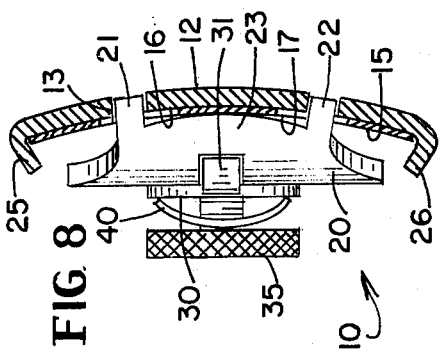
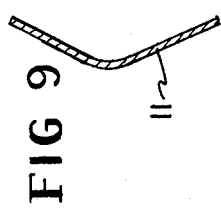

ARCUATE SCRAPER FOR CONCAVE SURFACES

BACKGROUND OF THE INVENTION

This invention relates to scrapers for removing foreign matter such as obsolete decalcomania from surfaces, especially glass surfaces, and more particularly to an arcuate scraper suitable for use on concave surfaces.

Many automobiles, for example, have curved glass windshields, the concave windshield surface facing the interior. Local ordinances frequently require that vehicle license decalcomania be mounted on the concave interior surface of the windshield. Such decalcomania often are difficult and time-consuming to remove due to the concavity of the windshield and the inconvenient location of the decal at the lower right.

Conventional single edge safety razor blades, screwdrivers and the like have been employed to remove the decals or other adhesively related displays, but have not been particularly satisfactory due to the relationship between the straight edges of the scrapers and the concave surfaces of the windshields. This is so despite the flexibility of the conventional safety razor blades.

One object of the invention, therefore, is to provide a scraper employing a scraping blade of the safety razor type wherein the blade is carried at the end of a convenient elongated handle and is maintained in arcuate shape so a substantial length of the scraping edge of the blade is able to engage the concave windshield surface and be effective quickly to remove the decal or other display.

Another object of the invention is to provide such an arcuate scraper wherein the scraping edge of the scraping blade is extensible and retractable with respect to the forward end of the handle. A keeper member is provided to lock the blade positively in the blade-extended and blade-retracted positions. In retracted position the blade edge is protected from damage, and, more importantly, is so disposed as to prevent accidental injury due to the sharp edge.

Another object is to provide an arcuate scraper of economical construction employing standard safety razor blade, three simple metal stampings, a securing member, such as a headed screw, and a spring washer. The latter urges the keeper into one or the other blade-locking positions, and permits the keeper to be tilted for unlocking.

SUMMARY OF THE INVENTION

The invention contemplates an arcuate scraper for concave surfaces comprising an elongated handle having a forward end portion arcuate in transverse cross section. A scraping blade of the safety razor type is disposed transversely on the concave surface of the forward end portion of the handle, the scraping edge of the blade adjacent the forward end of the handle.

A longitudinally movable slider is connected with the blade for moving the blade to extend and retract the scraping edge with respect to the forward end of the handle. In more detailed aspect, the slider includes a transversely arcuate forward portion bearing on the blade to hold the blade against the concave surface of the handle.

The scraper also includes a keeper operatively related to the slider for locking the slider and associated blade alternatively in blade-extended and blade-retracted positions. The keeper preferably is tiltable on the slider, and has a projection at the forward end alternatively engaging the slider at spaced locations for locking the slider in the aforesaid two positions. A resilient means, such as a spring washer, engages the tiltable keeper and urges same into the two locking positions. The keeper is tilted manually for unlocking, at which time the slider is actuated manually from one position to the other.

Securing means, such as a headed member, extends successively through an opening in the keeper and a longitudinally elongated slot in the slider into threaded engagement with the handle, the longitudinal travel of the slider, of course, being related to the length of the elongated slot.

Other objects, advantages and details of the invention will be apparent as the description proceeds, reference being had to the accompanying drawing wherein a preferred form of the invention is shown. It will be understood that the description and drawing are illustrative only, and that the scope of the invention will be measured by the appended claims.

BRIEF DESCRIPTION OF THE DRAWING

FIG. 1 is a top plan view of an arcuate scraper for concave surfaces embodying the invention, the scraping blade being shown retracted.

FIG. 2 is a fragmentary top plan view of the forward end portion of the scraper of FIG. 1, the scraping blade being shown extended.

FIG. 3 is a fragmentary bottom view showing the scraping blade retracted.

FIG. 4 is a fragmentary bottom view showing the scraping blade extended.

FIG. 5 is a front elevational view of the scraper showing the transversely arcuate shape of the forward end portion of the handle and of the scraping blade.

FIG. 6 is an enlarged fragmentary sectional view on line 6—6 of FIG. 1, the scraping blade shown retracted.

FIG. 7 is a fragmentary enlarged sectional view like FIG. 6, the scraping blade being shown extended.

FIG. 8 is an enlarged front elevational view, partly in section on line 8—8 of FIG. 2, showing further details of the invention.

FIG. 9 is a sectional view on line 9—9 of FIG. 1.

DESCRIPTION OF THE PREFERRED EMBODIMENT

Referring to the drawing, an arcuate scraper for concave surfaces embodying the invention is generally designated 10 in the various FIGS.

Scraper 10 includes an elongated handle 11 (FIG. 1) having a forward end portion 12 that is arcuate in transverse cross-section as best shown in FIGS. 5 and 8. The forward end of said end portion 12 has a pair of spaced openings 13 and 14 (FIGS. 1, 3, 4, 5 and 8).

A scraping blade 15 of the safety razor type is disposed transversely on the concave surface of forward end portion 12 of handle 11. Blade 15 has a pair of spaced openings 16 and 17 (FIGS. 1, 2, 3, 4 and 8) in general alignment with openings 13 and 14 in handle forward end portion 12. The relationship between openings 13 and 14 and openings 16 and 17 is best shown in FIG. 8. Blade 15 is arcuate in shape by virtue of its engagement with the concave surface of the arcuate end portion 12 of handle 11.

A longitudinally movable slider 20 (FIGS. 1, 2, 5, 6, 7 and 8) is operatively connected with blade 15 for moving the blade to extend and retract the forward scraping edge of the blade with respect to the forward end of handle 11. As best shown in FIGS. 5 and 8, slider 20 has a pair of spaced projections 21 and 22 passing through blade openings 16 and 17 and extending into openings 13 and 14 in forward end portion 12 of handle 11. Thus when slider 20 is moved forwardly, the sharp forward edge of blade 15 extends beyond the end of forward end portion 12, as best shown in FIG. 7, and when slider 20 is moved rearwardly, the sharp forward edge of blade 15 is retracted, as best shown in FIG. 6.

Slider 20, as illustrated, has a convex forward end 23 bearing on the central portion of blade 15, as best shown in FIG. 8. This convex forward end 23 cooperates to make blade 15 conform to the associated concave surface of handle end portion 12.

Upstanding projections 25 and 26, best shown in FIGS. 1, 2, 5 and 8, at the sides of forward end portion 12 of handle 11 may be provided to facilitate assembly of blade 15 originally, or for replacement, and to maintain the arcuate shape of the blade. Projections 25 and 26 also function to guide blade 15 as it travels longitudinally in response to movement of slider 20, and to protect the corners of blade 15 when the blade is retracted.

A keeper 30 (FIGS. 1, 2, 6, 7 and 8) is operatively related to slider 20 for locking the slider and associated blade 15 alternatively in blade-retracted and blade-extended positions, the positions respectively shown in FIGS. 6 and 7. As will be seen, keeper 30 is actuated by tilting, and has a forward projection 31 (FIGS. 5, 6, 7 and 8) adapted alternatively to engage the forward end of slider 20 to lock the slider in blade-retracted position (FIG. 6) and engage another portion of slider 20 to lock the slider in blade-extended position (FIG. 7).

The parts of the scraper heretofore described are held in assembled relation by securing means such as a headed securing member 35 having a threaded shank 36 (FIGS. 6 and 7) received within a threaded opening in forward end portion 12 of handle 11. Member 35 has an enlarged shank 37 (FIGS. 6 and 7) which extends loosely through a circular opening in keeper 30 and bears on the upper surface of slider 20. Shank 36 extends through a longitudinally elongated slot 38 in slider 20, the slot 38 permitting slider 20 to move longitudinally to blade-extended and blade-retracted positions. As shown in FIG. 7, projection 31 of keeper 30 enters elongated slot 38 of slider 20 to lock slider 20 in blade-extended position.

A resilient means such as a spring washer 40 (FIGS. 6, 7 and 8) is positioned between the head of headed securing member 35 and keeper 30 to permit keeper 30 to be tilted manually to unlock slider 20, the resilient means 40 being effective to return keeper 30 to the locking positions.

When scraper 10 is not in use, slider 20 and blade 15 should be in the safe, blade-retracted position shown in FIGS. 1, 3 and 6. When use of the scraper is desired, keeper 30 simply is tilted manually, releasing keeper projection 31 from locking engagement with the forward end of slider 20, and the slider is moved forwardly thereby moving the forward sharp edge of scraper blade 15 beyond the forward end of the handle. When keeper 30 is released, resilient means 40 moves keeper 30 into locked position wherein keeper projection 31 is received within slot 38 of slider 20, as shown in FIG. 7. Blade 15 thus is locked in blade-extended position, and the scraper may be used effectively to remove decals or the like from concave surfaces such as automobile windshields. Blade 15 is retracted simply by again tilting keeper 30 and moving slider 20 rearwardly, and releasing keeper so that keeper projection 31 again engages the forward end of slider 20 to prevent unwanted forward movement.

From the above description it is thought that the construction and advantages of this invention will be readily apparent to those skilled in the art. Various changes in detail may be made without departing from the spirit or losing the advantages of the invention.

Having thus described the invention, what is claimed as new and desired to secure by Letters Patent is:

1. An arcuate scraper for concave surfaces, comprising:
   an elongated handle having a forward end portion arcuate in transverse cross section;
   a scraping blade disposed transversely and nested on the concave surface of said forward end portion, said blade conforming to the shape of the concave surface;
   a longitudinally movable slider connected with said blade for moving said blade to extend and retract the scraping edge thereof with respect to the forward end of said handle;
   a keeper operatively related to said slider for locking same and said blade alternatively in blade-extended and blade-retracted positions; and
   means securing said blade, said slider and said keeper with respect to said handle and to each other, said means including resilient means urging said keeper into locking relations with said slider.

2. The arcuate scraper of claim 1 wherein said slider includes a transversely arcuate forward portion bearing on said blade to hold same against said concave surface of said handle.

3. The arcuate scraper of claim 1 wherein said arcuate forward end portion of said handle has lateral upstanding projections engaged by the lateral edges of said blade to facilitate assembly of said blade, to guide said blade in moving between extended and retracted positions, to aid in maintaining the arcuate shape of said blade and to protect the corners of said blade when in retracted position.

4. The arcuate scraper of claim 1 wherein said securing means includes a headed member extending successively through said keeper and said slider into threaded engagement with said handle, said slider having a longitudinally elongated slot for said headed member, permitting longitudinal movement of said slider.

5. The arcuate scraper of claim 4 wherein said keeper is tiltable on said slider and has a projection at the forward end alternatively engaging the forward end of said slider and entering said elongated slot in said slider to lock said slider respectively in blade-retracted and blade-extended positions.

6. An arcuate scraper for concave surfaces, comprising:
   an elongated handle having a forward end portion arcuate in transverse cross-section, said forward end portion having a pair of spaced openings in the forward end;
   a flexible scraping blade disposed transversely on the concave surface of said forward end portion, said blade having a pair of spaced openings in general alignment with said openings in said forward end portion;
   a slider having a pair of spaced projections passing through said blade openings into the openings in said forward end portion and a convex forward end bearing on said blade, said slider having a longitudinally elongated slot, said slider longitudinally movable to extend and retract the scraping edge of said blade with respect to the forward end of said handle;

a keeper for said slider for permitting movement of said slider and for locking same in blade-extended and blade-retracted positions, said keeper tiltable and having a projection adapted alternatively to engage the forward end of said slider to lock same in blade-retracted position and to enter said slider slot to lock the slider in blade-extended position;

a headed securing member extending through said keeper and said elongated slot in said slider into engagement with said handle; and resilient means between the head of said securing member and said tiltable keeper for urging same into blade locking positions.

* * * * *